United States Patent [19]
Blann

[11] 4,024,055
[45] May 17, 1977

[54] METHOD OF REDUCING LEAD AND ACID WASTE CONTAMINATION IN BATTERY PLANT OPERATION

[75] Inventor: William Arthur Blann, New Berlin, Wis.

[73] Assignee: Globe-Union Inc., Milwaukee, Wis.

[22] Filed: Dec. 18, 1975

[21] Appl. No.: 642,109

Related U.S. Application Data

[63] Continuation of Ser. No. 493,584, Aug. 1, 1974, abandoned.

[52] U.S. Cl. .................................. 210/45; 210/49; 210/51; 210/DIG. 1; 423/531; 423/559; 252/182.1
[51] Int. Cl.² ..................... C02B 1/20; C02B 5/02
[58] Field of Search ............... 210/42, 51, 47, 49, 210/45, DIG. 1; 136/165, 176; 423/522, 531, 559, 659

[56] References Cited

UNITED STATES PATENTS

| 1,610,899 | 12/1926 | Stewart | 423/559 |
| 1,627,351 | 5/1927 | Stewart | 423/559 |
| 1,783,986 | 12/1930 | Stewart | 423/559 |

OTHER PUBLICATIONS

Chem. Abstracts, vol. 14 8086.

Primary Examiner—Frank A. Spear, Jr.
Assistant Examiner—E. G. Therkorn
Attorney, Agent, or Firm—Neuman, Williams, Anderson & Olson

[57] ABSTRACT

A method of reducing the sulfate ion and sulfuric acid contamination of waste water in lead-acid battery manufacturing operations and recovery of the lead in salvageable form is provided which comprises neutralizing aqueous sulfuric acid wastes by treatment with waste battery paste containing lead oxide under controlled pH conditions.

9 Claims, 3 Drawing Figures

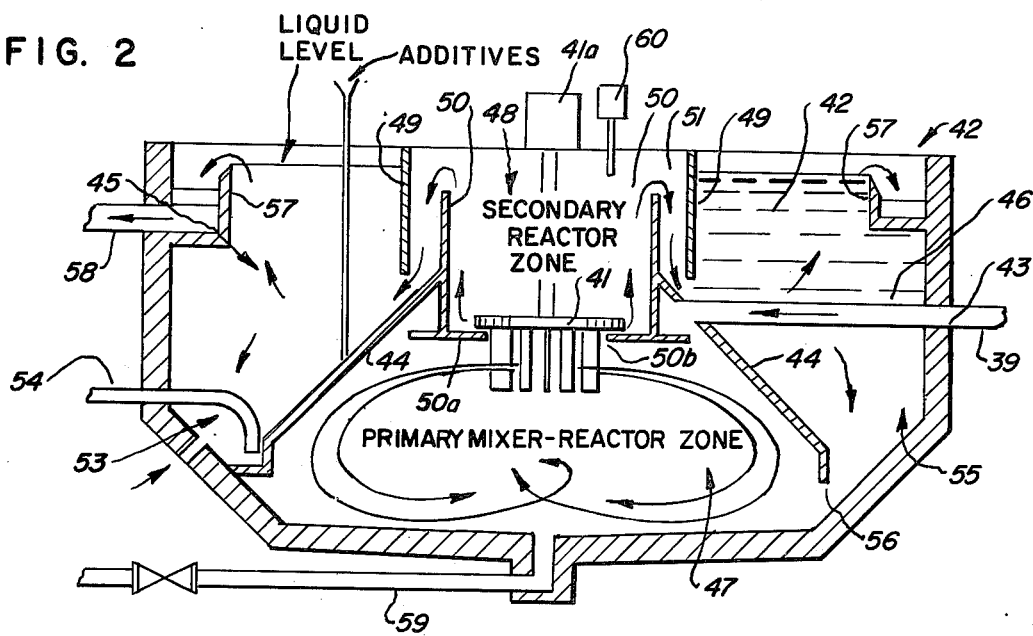
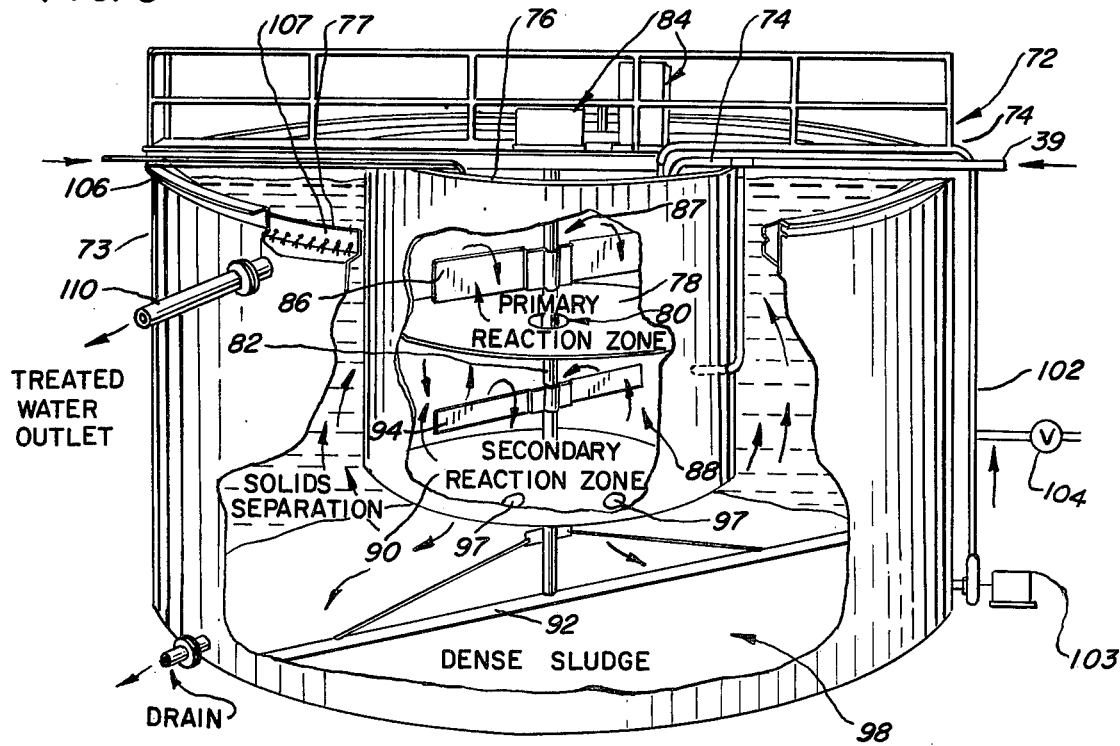

METHOD OF REDUCING LEAD AND ACID WASTE CONTAMINATION IN BATTERY PLANT OPERATION

CROSS REFERENCE TO RELATED APPLICATIONS

This application is a continuation of my application, Ser. No. 493,584, filed Aug. 1, 1974, now abandoned.

BACKGROUND OF THE INVENTION

1. Field of the Invention

This invention relates to methods of reducing the sulfuric acid contamination of waste water effluents from battery manufacturing operations by neutralization of the sulfuric acid with waste battery paste containing lead oxide.

2. Description of the Prior Art

The manufacture of so-called lead acid batteries produces two contaminating waste products which find their way into waste waters which are discharged into municipal sewerage systems and eventually into natural streams or bodies of water, thereby reducing the quality of the environment. These contaminants are sulfuric acid which is used to manufacture the battery electrolyte used in lead-acid batteries and also used in forming the battery paste which is pasted to the grids of the battery. The other contaminant is waste battery paste from the grid pasting operation, largely formed of lead sulfate and lead oxide. The paste is a solid waste which, after neutralization, is normally disposed of in solid waste dump areas. Many municipalities object to wastes containing lead for various reasons, the chief one of which is that there is a possibility of lead contamination of ground waters by percolation of normal rainfall through the solid waste disposal area, and when solid wastes are used for land fill operations, a high concentration of lead could present a health hazard to later occupants.

Previous procedures for neutralization of sulfuric acid involved the use of low-cost alkaline materials such as sodium hydroxide which, by reaction with the sulfuric acid, produces a sodium sulfate, which is then passed into effluent waste water streams and discharged to the local sewerage system. Some municipalities object to this disposal and technique because of reports that sodium sulfate would damage concrete sewer pipes. Moreover, since sodium sulfate is soluble in water, the sulfate ion content of the waste water is not decreased. Some agencies have set standards for sulfate ion content in waste water effluents, but any neutralization process which produces a soluble sulfate salt would present difficulties in meeting any standard.

Lime has also been employed as a neutralization agent for sulfuric acid and battery pastes which contain sulfuric acid. The disadvantage of lime neutralization is that it produces a solid sludge. When employed in paste neutralization the end product has no scrap value. Further, the combined lime sludge is normally contaminated with a small amount of lead, and for that reason is generally considered as an unacceptable waste product in solid waste disposal areas, especially those which are intended to be used for future commercial, industrial or residential sites, or those which border on bodies of water. It is assumed that the lead content of the calcium sulfate solid produced by lime neutralization could present a hazard to fish and other wildlife as well as to humans in the area.

Ammonia has also been used as an alkaline neutralizing agent, but this material presents problems from the point of view of producing soluble sulfates and a fume hazard, as well as a nitrogen pollutant in the waste effluent.

The process of the present invention eliminates many of the problems associated with the disposal of sulfuric acid and lead wastes which are produced by the lead-acid battery manufacturing operations. The process not only permits discharge of the aqueous component of the aqueous sulfuric acid waste at acceptable pH levels, i.e. approximately neutral, but also reduces the sulfate ion content of any discharge waste water to relatively low levels acceptable to most municipal sewerage and environmental control agencies. Furthermore, the process permits the recovery of lead in a form suitable for salvage or scrap and reduces the contamination of both solid and liquid wastes with lead compounds or lead ion.

SUMMARY OF THE INVENTION

A process for treatment of aqueous sulfuric containing waste water in a lead-acid battery manufacturing plant to neutralize acid and reduce sulfate ion content which comprises contacting a waste water containing sulfuric acid with a waste battery paste containing lead oxide to form a slurry reaction mixture, regulating the proportion of waste battery paste added to said slurry to neutralize the sulfuric acid component and concomitantly adjust the pH of the reaction slurry to a predetermined level of minimum solubility of the lead sulfate precipitate formed, and separating the aqueous liquid portion of the slurry from the lead sulfate and other solid materials.

The neutralized liquid water fraction recovered from the treatment process may be either discharged into the sewerage system or may be recycled for use in the battery manufacturing process.

Generally, the pH of the effluent aqueous fraction produced by the process may range from about 2 to about 9.5. It has been determined that lead sulfate formed in the process and which is also a component of the waste battery paste, has a minimum solubility in the pH range noted above, which is to say, a solubility of about 0.0033 ppm. or mg/liter. The Environmental Protection Agency (EPA) has established a pH range of effluent discharge of from 5.5 to 8.5, which is a preferred range of pH for the effluent or discharge water of the process of this invention, with a neutral range of 6 to 8 or neutral per se (pH 7) being the most preferred pH. Accordingly, the process of this invention is especially useful since it produces a waste water effluent within the desired pH range (acceptable under EPA standards), produces minimal sulfate ion contamination and produces minimum soluble lead ion contamination. It has also been determined that lead oxide and lead hydroxide (which are present in the paste and in a conventional neutralization process) are both more soluble (0.22 ppm or mg/liter) than lead sulfate (0.0033 ppm) by a factor of about 100 fold. Furthermore, both display minimum solubility at a pH of about 9.5 which is outside the EPA standards and far from the desideratum of pH 7. Thus, the process of the present invention inherently produces a superior quality effluent from the standpoint of lead contamination and pH.

The battery paste agent used to neutralize the sulfuric acid component of waters contaminated therewith is generally a mixture of lead oxide, free lead, and lead sulfate. Since the lead oxide is the only active neutralizing agent for the free sulfuric acid component in the waste water, the proportion of paste employed with respect to sulfuric acid will vary depending upon the quantity of available lead oxide present. Generally speaking, about 8½ lbs. of paste per pound of sulfuric acid in the waste water is a common ratio, but ranges of from 4 to 10 lbs. of paste per pound of sulfuric acid are useful.

The process of the present invention, however, does not require analysis of the lead oxide present in the waste battery paste produced at any particular time in the battery manufacturing operation since the apparatus used in the process automatically regulates the flow of battery paste solids which come into contact with the sulfuric acid containing water stream to achieve the optimum ratio of these two components to obtain an effluent liquid stream of the desired pH, that is to say, essentially neutral, and having a relatively low sulfate ion content.

The process of the present invention is preferably carried out on a continuous basis since the waste products are also produced continuously. Batch processing, however, can be employed. Generally, the lead oxide containing paste is in the form of a dilute slurry of low solids (i.e. 1–5%) content. To minimize water handling, it is desired to increase the paste solids prior to combining the paste with the aqueous acid in the neutralization step. Generally, the pre-treatment of the paste involves screening to remove large particles of scrap, centrifugal concentration using cyclones or continuous feed centrifuges and a settling tank for further concentration. The liquid cyclone produces a solids content in the range of from 20 to 40% or more. The slurry underflow or solids containing fraction is passed to a settling and holding tank for decantation. The slurry solids from this tank is usually about 50 to 75%, but pumpable.

The actual neutralization process is carried out under flowing or agitated slurry conditions since one of the reactants (paste) is a particulate solid. In order to secure the necessary contact of the reactants for neutralization, a uniform reaction mixture is required which, in turn, requires turbulent flow mixing in the neutralization step. This may be achieved by turbulent flow reactors or by mixing or stirring equipment.

The solid precipitate of lead sulfate with small amounts of lead oxide and other solids, which is recovered from the process, is highly concentrated insofar as lead content is concerned. In this form it is especially adapted for recovery or reclaim of lead by smelting, thereby reducing the cost of the process and minimizing the lead contamination in solid wastes which often is a factor in processes of the prior art.

Accordingly, one object of this invention is the provision of a process for reducing the acidity and sulfate ion content of the waste water streams from lead-acid battery manufacturing plants.

Another object is the provision of a process which will produce a high quality waste water discharge which meets EPA standards.

Another object is the provision of a process which minimizes lead contamination both in solid and liquid wastes.

A still further object is the provision of a process for treatment of wastes in lead-acid battery manufacturing operations and permits recovery of the lead content of wastes for reuse in battery manufacture.

BRIEF DESCRIPTION OF THE DRAWINGS

Reference is made to the attached drawings wherein:
FIG. 2 is a schematic illustration in cross section of a mixing and reaction chamber employed in the process of the present invention;
and
FIG. 3 is a perspective view partially broken away of another embodiment of a mixing and reaction chamber which may be employed in the process of the present invention.

DETAILED DESCRIPTION OF THE INVENTION

Figure 1:
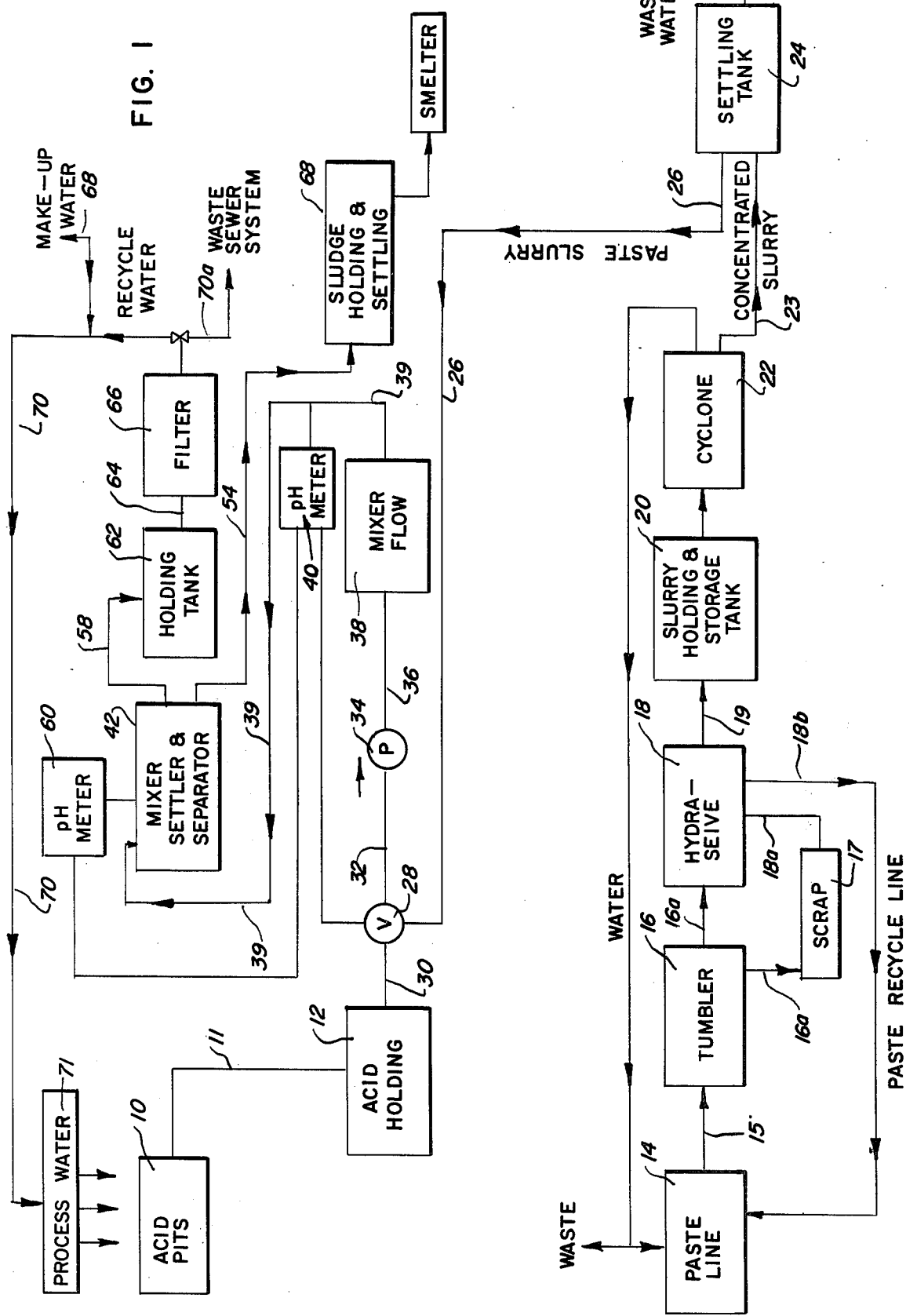
FIG. 1 is a schematic flow sheet flowing the sequence of operations in the process of the present invention.

Referring to FIG. 1 of the drawings, there is illustrated a flow sheet of the process of this invention wherein an aqueous waste water effluent containing sulfuric acid is conveyed from the acid pits 10 where spillage from the battery filling operation occurs, via line 11, to an acid holding tank 12. Similarly, battery paste, chiefly lead sulfate containing lead oxide, from the battery or plate paste-up line is collected as an aqueous slurry in the paste line 14 at a solids content of about 1 to 5%. The slurry passes via line 15 to a tumbler 16 which screens out and removes large solid particles from the dilute paste slurry. The solid particles or scrap are recovered on the screen of the tumbler and the slurry passes via 16a to an inclined screen strainer (C.E. Bauer Co.) Hydrasieve 18 for further removing scrap and solid materials. Solid scrap from these operations is recovered and disposed of at (17). From the Hydrasieve the paste slurry passes via line 19 to a holding tank 20 and then to a cyclone or centrifugal concentrator 22 where the slurry is concentrated to in the range of 20 to 40% solids, preferably 25 to 30%. This range is not critical, except that the separation process reduces the amount of water handling involved in the employment of the paste solids which contain the lead oxide neutralizing component. Underflow from the cyclone separators passes via line 23 to a settling tank 24 where further solids concentration occurs. The slurry solids at this point from the bottom portion of the slurry tank range between about 60 and 75%. The slurry solids pass from settling tank 24 through the slurry line 26 to mixing valve 28. Mixing valve 28 combines the slurry of battery paste from line 26 with the aqueous acid stream in line 30 which draws from acid holding tank 12. The mixed effluent from mixing valve 28 passes via line 32 to pump 34 which discharges by line 36 to a baffled, inflow, turbulent reactor-mixer 38 such as a Kenics mixer. This mixer reactor has no mechanical moving parts but rather relies on a series of baffles to provide the necessary turbulence to insure proper mixing of the aqueous acid and the battery paste solids. A pH meter and valve controller 40 monitors the acidity or basicity of the effluent discharged through line 39 from mixer 38. This pH meter normally has pH settings of from 2 to 5. These settings may, however, be selected by process experience to any particular range of values which will accommodate the particular plant operations and produce the desired result. The pH meter and controller 40 operates mixing valve 28, regulating the flow of battery paste slurry permitted to enter the acid line 32 to react with and neutralize the acid component. Control settings are such that at the lower limit of predetermined pH, say for example pH 2, the pH meter and valve regulator 40 will open valve 28 to introduce more paste slurry and when the pH reaches the upper end of the preset range, such as pH 5, the regulating device 40 will close valve 28. There is a time lag in the neutralization process between the point of actual mixing at valve 28 to the point of the pH measurement in line 39 by meter 40 of from 10 to 15 minutes. The effluent in line 39 passes to a second reactor, mixing and separator tank 42 of the type shown in FIGS. 2 and 3 of the drawings. In reactor tank 42 additional mixing and reacting occurs, together with separation of the liquid water component and settling of the solid precipitate of lead sulfate. Referring to FIG. 2 of the drawings, the reaction and settling tank 42 is illustrated in cross section showing an inlet port 43 which receives the slurry from line 39 which is connected to mixer 38. A conical baffle 44 is disposed centrally in the chamber 45 of mixer 42. The slurry pases from inlet 43 through pipe 46 to an interior zone 47 of the chamber defined by the conical baffle 44. The zone 47 is called a primary mixing and reaction zone. A stirrer, particularly a motor 41a driven impeller rotor 41, extends into chamber 47 providing for mixing of the slurry in zone 47 with some portion being driven up by the impeller 41 into a secondary mixing and reaction zone 48 defined by a pair of co-axial, spaced apart, cylindrical walls 49 and 50 and a bottom plate 50a which is apertured at 50b to accommodate the impeller 41. The slurry is further mixed in secondary reaction zone 48. A portion of the slurry overflows baffle wall 50 and passes down by gravity in the space 51 defined by walls 49 and 50. Part of the slurry settles by gravity and is collected in the sump area designated by the numeral 53. This concentrated slurry of the lead sulfate reaction product is discharged from the collection point 53 via line 54. A portion of the slurry also passes from secondary mixing zone 48 to the return zone designated by the numeral 55 and then through space 56 returns to the primary mixing and reaction zone 47 for recycle through zone 48, aiding in a more complete neutralization reaction in the vessel. Neutralized effluent liquid (water) in the chamber is collected by overflow trough 57 and passes out through line 58. Total residence time of the reactants in reactor 42 is from about 100 to 150 minutes with 120 to 130 being preferred. The capacity of the tank 42 is about 10,000 gallons and the flow rate (discharge and input) is about 75 to 85 gals/min. Grit and sediment which accummulate in tank 42 may be removed through valve vent 59.

A pH meter and valve controller 60 also monitors the pH of the liquid in zone 48 of reactor 42. This meter and controller is set with upper and lower limits which correspond to the desired pH of the effluent, say for example 6 to 8. In the event that the pH drops below the pre-set level, the controller connected to pH meter and valve controller 40 overrides this control and causes the mixing valve 28 to open. The relationship between pH meter and valve controllers 60 and 40 is that of master and slave, controller 60 modulating the control exercised by controller 40.

The effluent neutralized water fraction withdrawn from reactor 42 via line 58 is passed to a holding and filter feed tank 62 via line 58 and from tank 62 via line 64 to a sand bed filter 66 and with some make-up water (line 68) may be recycled in the process via line 70 and holding tank 71 and used in various battery manufacturing processes.

Alternatively, the processed water may be dumped into the sewerage system via line 70a.

The slurry solids consisting principally of lead sulfate and collected as a concentrated slurry and withdrawn via line 54 has a solids content ranging from about 60 to about 75%. The slurry may be further dewatered by holding in a settling tank 68. The solids recovered are suitable for shipment to the smelter to reclaim the lead content thereof, but may also be recycled into the battery plate pasting operation as is a portion of the battery paste from the Hydrasieve 18 conducted to the paste pits 14 via line 18b.

FIG. 3 of the drawings illustrates another embodiment of a reactor and separator vessel 72 which can be employed in lieu of the apparatus illustrated in FIG. 2 of the drawings. In this apparatus the combined slurry from line 39 is introduced into the cylindrical reactor vessel designated by the numeral 72 via feed pipe 74 to an open top interior reaction chamber 76 of essentially cylindrical construction and placed co-axially in the center of the space 77 defined by the cylindrical vessel wall 73 of chamber 72. This cylindrical interior chamber 76 is divided into a primary and secondary reaction zone by a baffle plate 78 disposed therein. This plate has a central aperture 80 through which a composite concentric mixing shaft 82 extends. The mixing shaft 82 is connected to a drive motor and right angled gearing mechanism generally designated by the numeral 84 and is provided with a mixing arm 86 affixed to the shaft 82 so as to sweep and agitate the contents of the chamber portion designated as the primary reaction zone 87. The inner shaft of concentric shaft 82 rotating at a lower speed also extends through the aperture 80 in the plate 78 through a bottom plate 90 in the cylinder 76 terminating in a sweep arm 92 which generally extends across the entire diameter of the chamber 72 to move slurry solids contained therein to a collection point (not shown) adjacent pump 103. A sweeping or mixing arm 94 is affixed to the shaft 82 and adapted to agitae the contents of the secondary reaction zone in the same fashion as the mixing arm 86 provides agitation and mixing in the primary reaction zone. Accordingly, reactants in slurry form pass through inlet pipe 74 as indicated above and are delivered into the primary reaction zone agitated by the mixing arm 86 affixed to the shaft 82 driven in turn by the mechanism 84. Part of the slurry in the primary reaction zone passes through the aperture 80 surrounding the shaft 82 to the secondary reaction zone immediately therebelow where further mixing occurs. The slurry then passes through the apertures 97 provided in the bottom plate 90 of the secondary reaction zone and pass into the bottom portion 98 of the reaction chamber 72. Sweeping or movement is provided by the arm 92 affixed to the bottom end of the shaft 82. Solids generally tend to accumulate in the lower portion 98 of reaction chamber 72 but some suspended solids are recirculated via the conduit designated by the numeral 102 and pump 103 to the primary reaction zone. The solids, consisting chiefly of lead sulfate, are withdrawn at vent 104 and may be further concentrated to increase their solids content by passage through cyclones, settling tanks, filters or the like (not shown). The neutralized water or aqueous liquid fraction passes upwardly in the chamber and is collected in the trough 106 disposed circumferentially and interiorly of the top portion of the cylinder 72. The water flows through the plurality of apertures 107 formed in the inner wall or portion of the trough 106. The water collected passes out through vent pipe 110 and is processed generally in the same manner as described above.

The process of the present invention is especially useful in treating aqueous wastes from lead acid battery plants to neutralize the same and minimize the sulfate ion contamination in effluent waste waters. For example, acid contaminated waste water treated by the process of the present invention and containing sufficient acid to have an acidity in the range of about pH 1, when treated by the process of the present invention in a 5-day work week was discharged into a sewerage system at a pH ranging from about 6.5 to about 6.9. The volume of fluid discharged to the sewer ranged from about 16,500 gallons to about 22,000 gallons per day. The sulfate ion content of the effluent after treatment by this process ranged between about 323 to about 450 parts per million. The pH control over a period of one month averaged about 6.9 (20 working days), well within the range of desideratum of 6 to 8, and the lowest recorded pH in an entire month's operation was 6.0 and the highest 8.4.

Operations of a plant employing neutralization of the acid by sodium hydroxide, while capable of regulating the acidity to within the desired range, produced sulfate ion contents in the effluent which were well about 1000 and ranged as high as 2000 parts per million or more.

It should be recognized that the water may be additionally treated by membrane dialysis to remove other ionic contaminants. Chemical additives can include the use of sodium phosphate, sodium carbonate or sodium silicate to remove traces of dissolved lead. The chemical flocculation agents are added prior to the filtration step. Generally, the process of this invention produces an effluent water which without further chemical treatment has a lead content of 1 ppm or less, which may be further reduced with additional treatment.

The flocculating chemicals used to remove dissolved lead in the treated water include, for example,
1. 50 mg/l sodium phosphate;
2. 10 mg/l sodium phosphate plus 50 mg/l sodium carbonate;
3. 50 mg/l sodium carbonate plus 5 mg/l ferrous sulfate;
4. 50 mg/l sodium carbonate followed by 5 mg/l of alum.

Since the neutralization reaction is slow, the residence time in the neutralization reactors should be 30 minutes or more. With longer reaction times, the excess of paste (PbO) required is lower. A typical paste contains about 60% PbO, 25% free lead and 15% lead sulfate, but this may vary.

What is claimed is:

1. A process for treatment of aqueous sulfuric acid waste water in a lead-acid battery manufacturing plant to neutralize the sulfuric acid an reduce the sulfate ion content thereof to produce a waste sewage water effluent with a pH between about 5.5 and 8.5 and which has a sulfate ion content less than about 600 ppm., which consists essentially of:
   a. forming a reaction mixture slurry by combining a waste water stream of sulfuric acid waste with a stream of an aqueous slurry of waste battery paste containing lead oxide through a turbulent in-flow reactor and mixing zone providing turbulent flow mixing conditions, said waste battery paste being essentially the sole neutralizing agent for the sulfuric acid present, to form a slurry reaction mixture;
   b. concomitantly adjusting the proportion of waste battery paste added to said slurry to neutralize the sulfuric acid component and concomitantly adjust the pH of the reaction slurry to between about 5.5 and 8.5, forming essentially an insoluble solid sulfate precipitate predominately of lead sulfate which displays minimal solubility within said pH range;
   c. passing the effluent from said reactor zone to a further zoned reactor and separator which comprises a primary and secondary agitated reaction zone;
   d. passing the effluent slurry from the primary and secondary agitated reaction zone to a settling and precipitation zone wherein lead sulfate and other solids are separated from the aqueous portion of the slurry by gravity;
   e. recovering the neutralized aqueous liquid component of the slurry as an effluent having a pH of from 5.5 to 8.5 from the solid lead sulfate precipitate and other solid materials; and
   f. recovering the lead sulfate solids for conversion to lead and lead oxide and recycle and reuse as battery paste in the manufacture of batteries.

2. A process according to claim 1 wherein the slurry employed in the reaction mixture has a solids content of at least 50%.

3. A process according to claim 1 wherein the process is carried out on a continuous flow basis.

4. A process according to claim 1 wherein the reaction is carried out on a continuous flow basis in a plurality of turbulent flow mixing reaction zones.

5. A process according to claim 1 wherein the rates of addition of the battery paste slurry to the waste aqueous acid stream is determined by measurement of the pH of the effluent stream of treated water recovered from said process.

6. A process according to claim 1 wherein the neutralized aqueous component recovered from the process is recycled to the battery manufacturing process.

7. In a lead-acid battery manufacturing operation producing waste streams of water contaminated with sulfuric acid and waste battery paste containing lead oxide, lead sulfate and lead, the process for reducing the environmental contaminating effect of aqueous sulfuric acid, soluble sulfate ion and lead solubles in effluent waste water from said process and solid wastes from said process containing lead values which consists essentially of the steps of:
   a. contacting a waste water stream containing sulfuric acid from a lead-acid battery manufacturing operation with an aqueous stream of waste battery paste in pumpable slurry form having a solids content of at least 20% and containing lead oxide as a principal component, in a confined stream and under turbulent flow mixing and reacting conditions to produce a slurry reaction mixture;
   b. concomitantly adjusting the proportion of said lead oxide containing battery paste waste to substantially neutralize the sulfuric acid to produce a water component in the reaction slurry having a pH between about 5.5 and 8.5 and concomitantly form a precipitate of lead sulfate whereby the solubility of the lead sulfate precipitate formed is at a minimum and substantially all of the lead and sulfate ion components of the reaction slurry are in an insoluble lead sulfate form;

c. passing the effluent reaction slurry from the turbulent flow reaction zone to an agitated primary and secondary reaction and settling zone;

d. passing the effluent slurry from the secondary reaction zone to a settling and precipitating zone and gravitationally separating under non-turbulent conditions and recovering the precipitated lead sulfate solids from the neutralized water component of the waste stream slurry when precipitation is complete, for conversion of the lead sulfate to lead and lead oxide and recycle and reuse as battery paste in the manufacture of batteries; and e. recovering a neutralized water component from the separating zone as a stream having a pH of between about 5.5 and 8.5 and a sulfate ion content of less than about 600 ppm.

8. A process according to claim 7 wherein the pH of the recovered water is between about 6 and 8.

9. A process according to claim 7 wherein the water recovered in step (e) is recycled in the battery manufacturing process.

UNITED STATES PATENT AND TRADEMARK OFFICE
CERTIFICATE OF CORRECTION

PATENT NO. : 4,024,055
DATED : May 17, 1977
INVENTOR(S) : William Arthur Blann

It is certified that error appears in the above–identified patent and that said Letters Patent are hereby corrected as shown below:

Col. 4, l. 4 — "flowing" should be -- showing --

Col. 6, l. 39 — "agitae" should be -- agitate --

Col. 7, l. 25 — "about" should be -- above --

Col. 7, l. 56 — "an" should be -- and --
Claim 1

Signed and Sealed this nineteenth Day of July 1977

[SEAL]

Attest:

RUTH C. MASON
*Attesting Officer*

C. MARSHALL DANN
*Commissioner of Patents and Trademarks*